US011930044B2

United States Patent
Kairali et al.

(10) Patent No.: US 11,930,044 B2
(45) Date of Patent: Mar. 12, 2024

(54) MOBILE EDGES WITH SMART COLLECTORS IN CLOUD SECURITY AND COMPLIANCE CENTER

(71) Applicant: International Business Machines Corporation, Armonk, NY (US)

(72) Inventors: Sudheesh S. Kairali, Kozhikode (IN); Sarbajit K. Rakshit, Kolkata (IN); Vijay Kalangumvathakkal, Pathanamthitta (IN); Nataraj Nagaratnam, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 17/568,805

(22) Filed: Jan. 5, 2022

(65) Prior Publication Data

US 2023/0216890 A1    Jul. 6, 2023

(51) Int. Cl.
*H04L 29/06* (2006.01)
*H04L 9/40* (2022.01)

(52) U.S. Cl.
CPC .............. *H04L 63/20* (2013.01); *H04L 63/10* (2013.01)

(58) Field of Classification Search
CPC ....... H04L 63/20; H04L 63/10; H04L 63/107; H04L 63/0227; H04L 63/0263; H04L 63/168
USPC ........................................................... 726/1
See application file for complete search history.

(56) References Cited

U.S. PATENT DOCUMENTS

| | | |
|---|---|---|
| 10,574,670 B1 | 2/2020 | Verma |
| 2015/0245160 A1* | 8/2015 | Agrawal ............... H04L 41/145 455/406 |
| 2019/0373443 A1 | 12/2019 | Palaniappan |
| 2019/0386883 A1 | 12/2019 | Bhat |
| 2021/0049127 A1 | 2/2021 | Kunchakarra |

FOREIGN PATENT DOCUMENTS

WO       2023131484 A1    7/2023

OTHER PUBLICATIONS

"Secure and Smart Routing of Security Posture Based on Sensitivity of Findings and Risk of Connections in Edge Computing via Intelligent Handshakes", An IP.com Prior Art Database Technical Disclosure, Authors et al.: Disclosed Anonymously, IP.com No. IPCOM000269073D, IP.com Electronic Publication Date: Mar. 19, 2022, 6 pages.

International Search Report and Written Opinion, International Application No. PCT/EP2022/085777, International Filing Date Dec. 14, 2022.

(Continued)

*Primary Examiner* — Longbit Chai
(74) *Attorney, Agent, or Firm* — Monchai Chuaychoo

(57) ABSTRACT

An approach for dynamically transitioning mobile client devices from one location to another within edge computing is disclosed. The approach includes retrieving locations for near edges and far edges and collecting one or more SCC (security compliance center) rules. The approach includes identifying edge access from one or more client devices and determining mobility pattern associated with the edge access. The approach includes determining edge recommendation based on the mobility patterns and applying the edge recommendation.

20 Claims, 5 Drawing Sheets

(56) References Cited

OTHER PUBLICATIONS

"Getting started with Security and Compliance Center", IBM Cloud Docs, Last updated Aug. 24, 2021, 5 pages, <https://cloud.ibm.com/docs/security-compliance?topic=security-compliance-getting-started>.

Atluri et al., "Efficient Enforcement of Security Policies based on Tracking of Mobile Users", In Proc. of the 20th Annual IFIP WG 11.3 Working Conference on Data and Applications Security, 2006, 15 pages.

Atluri et al., "Efficiently Enforcing the Security and Privacy Policies in a Mobile Environment", SpringerLink, Handbook of Database Security, downloaded from the internet on Oct. 21, 2021, 7 pages.

Filiposka et al., "Mobile-aware dynamic resource management for edge computing", Wiley, Trans Emerging Tel Tech. 2019;e3626, Accepted Mar. 29, 2019, DOI: 10.1002/ett.3626, 19 pages.

Gilly et al., "Supporting Location Transparent Services in a Mobile Edge Computing Environment", Advances in Electrical and Computer Engineering, vol. 18, No. 4, 2018, DOI: 10.4316/AECE.2018.04002, pp. 11-22.

Lachner et al., "Context-Aware Enforcement of Privacy Policies in Edge Computing", 2019 IEEE International Congress on big Data, Jul. 2019, DOI: 10.1109/BigDataCongress.2019.00014, 7 pages.

Plachy et al., "Dynamic Resource Allocation Exploiting Mobility Prediction in Mobile Edge Computing", 2016 IEEE 27th Annual IEEE International Symposium on Personal, Indoor and Mobile Radio Communications—(PIMRC): Mobile and Wireless Networks, 6 pages.

\* cited by examiner

MOBILE EDGES WITH SMART COLLECTORS IN CLOUD SECURITY AND COMPLIANCE CENTER

BACKGROUND

The present invention relates generally to the field of computing, and more particularly to edge computing.

The recent trend of edge computing extends cloud computing and the Internet of Things (IoT) to the edge of the network. Edge computing moves more computational power and resources closer to end users by increasing the number of endpoints and locating them nearer to the consumers—be they users or devices. Fundamentally, edge computing architectures are built on existing technologies and established paradigms for distributed systems, which means that there are many well understood components available to create the most effective architectures to build and deliver edge use cases.

A collector is an agent to collect compliance and security posture that will be installed in edge.

SUMMARY

Aspects of the present invention disclose a computer-implemented method, a computer system and computer program product for dynamically transitioning mobile client devices in edge computing. The computer implemented method may be implemented by one or more computer processors and may include, retrieving locations for near edges and far edges; identifying edge access from client devices; determining mobility pattern associated with the edge access; and applying SCC (security compliance center) rules to the edge access.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
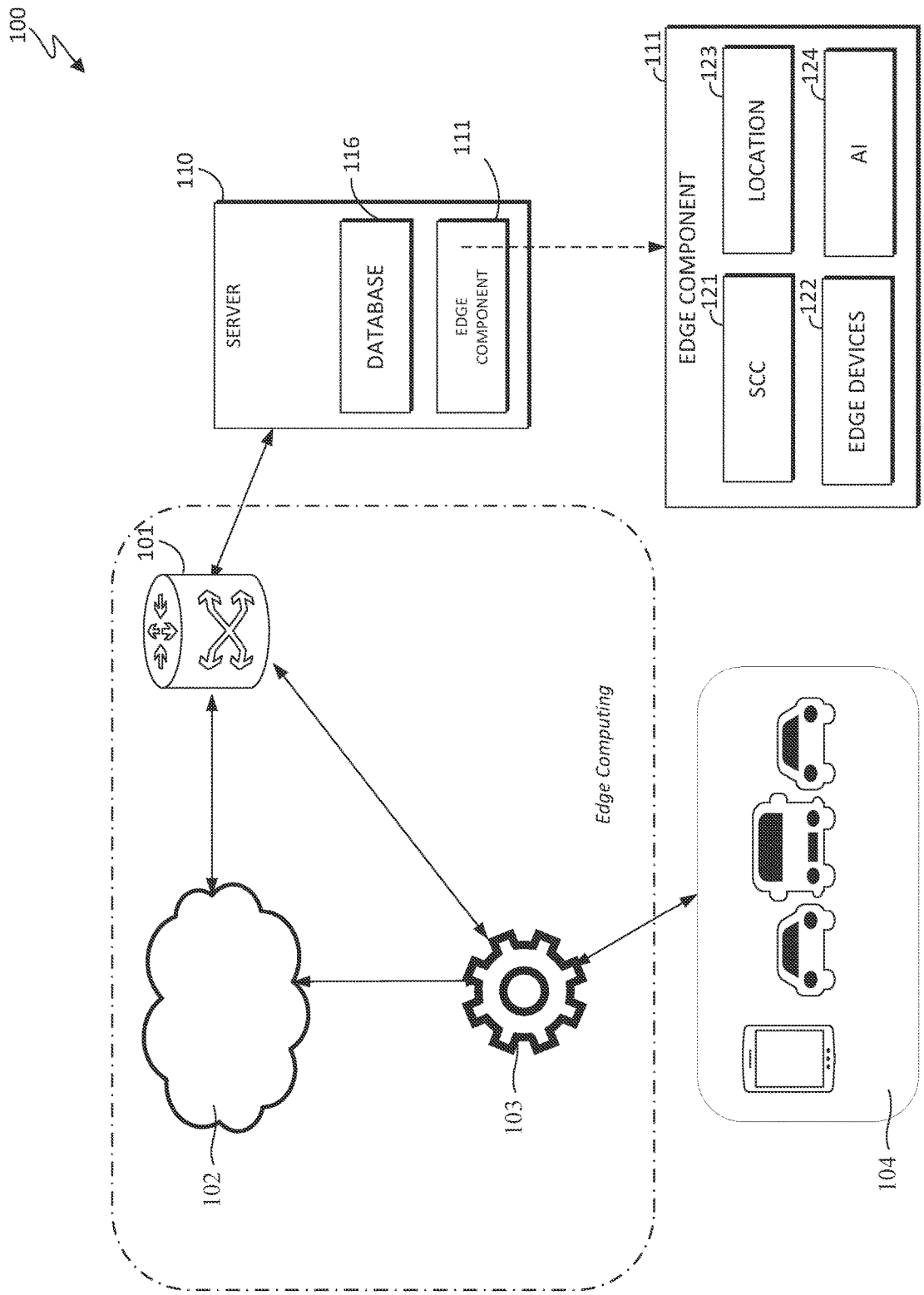
FIG. 1 is a functional block diagram illustrating an edge environment, designated as 100, in accordance with an embodiment of the present invention.

The current state of art as it pertains edge computing, specifically with security and compliance with edge devices on the cloud can present some challenges. One challenge, for example, a scenario where mobile far edges are moving from point1 to point2—the compliance and security requirements changes based on the geographical location between point1 and point2. Thus, this makes it difficult to find a foolproof solution for moving edges compliance requirements.

Embodiments of the present invention recognizes the deficiencies in the current state of art as it relates to providing compliance and security for edge computing and provides an approach. One approach comprises a specialized collector and/or scanners. The approach allows for the collection of locations (e.g., beginning to destination) of the moving edge devices and dynamically fulfill security and compliance requirements during the change in location of the edge devices. For example, there are collector/scanners—who are handed over (a) which goals/policies to scan and (b) which targets to scan. And this disclosure talks about how embodiments can handle this intelligently in case if of mobile edges.

Some embodiments of the present invention provides an approach that provides that disclose a system and a method of smart collectors in mobile edges powered by intelligent handshake with cloud security and compliance center.

Some embodiments of the present invention provides an approach that provides a step for location to SCC mapping where, in security and compliance in edges there needs to be collectors/agents which can collect/scan security and compliance posture and send this to cloud server for analysis. Another step, provided by the approach is wherein; the system will have a mapping between location/region vs compliance & security requirements. Based on this mapping collectors (or it can be just changing rules or policies to execute) for each location can be made available.

Some embodiments of the present invention provides an approach that provides a step for dynamic location-based collector (Diff & Download) wherein, when an edge's location is changed from location1 to location2—system will check whether based on Location to SCC mapping, are there changes in the collector or rules.

Some embodiments of the present invention provides a step where, in some cases, new rules or goals need to be added. In some cases, some rules must be deactivated. In such cases, cloud SCC will send DIFF (add or remove) to the collector already running in the edge.

Some embodiments of the present invention provides an approach for a step where, in some cases collector type itself will change. System will handshake with edge and will allow to download latest collector and deactivate previous one.

Some embodiments of the present invention provides an approach that provides a step for predicted route-based Collector update wherein, the system will keep tracking the mobility pattern of the mobile edges. Based on this if system finds that Edge is going to cross the Location to SCC mapping in 2 hours and it requires considerable download (collector or rules), system will start sending this data to edge while it is still on the path. New collector will not be installed until the edge crosses the SCC boundary. As soon as the edge crosses the boundary new installations will happen or new rules will be activated, or invalid rules will be deactivated.

Some embodiments of the present invention provides an approach that disclose a step for intelligent predetermination of irrelevant collection process where, in some cases, edge1 might be in transit while the Collection process has started based on location 1's SCC rules or goals. If system finds that the scan usually takes 30 mins to complete based on history of previous scans in location1, and transit will happen in 15 mins, system may decide to pre terminate the collection process as the results will be irrelevant by the time, they are available.

Some embodiments of the present invention provides an approach that disclose a step for recommendation of route adjustment based on resources required for compliance and security scans where, in some cases, location1 might have heavy SCC requirements so the resources required to run the collector might be considerable. System can detect this based on edge1, edge2 which were there in the same location. Now based on edge3s mobility patter it's found that its moving towards location1 and also based on historical analysis system may find that edge3 may not have enough resources to spare to run SCC collector in location1. In such cases—intelligent location adjustment advises can be send to edge so as to reduce the resource requirements.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating an edge environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Edge environment 100 includes network 101, cloud SCC 102, collector 103 and client devices 104.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, cloud SCC 102, collector 103, client devices 104 and other computing devices (not shown) within edge environment 100. It is noted that other computing devices can include, but is not limited to, client devices 104 and any electromechanical devices capable of carrying out a series of computing instructions.

Cloud SCC (security compliance center) 102 is a system (or subsystem) that allows management (e.g., security, compliance, etc.) of edge devices to edge computing infrastructure. This can include allowing edge devices secured connection to the edge computing infrastructure including resources in the cloud. Other features may include, but it is not limited to the following, (i) automate security and compliance postures, (ii) enable configuration governance and (iii) detect vulnerabilities and threats.

Collector 103 is one or more agents to collect compliance and security posture that will be installed in edge.

Client devices 104 are electronic computing devices utilized by consumers in everyday life. For example, smartphones, wearable smart devices, smart vehicle, IoT (Internet of Things) devices, smart sensors and tablets.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within edge environment 100 via network 101. In another embodiment, server 110 represents a computing system utilizing clustered computers and components (e.g., database server computers, application server computers, etc.) that act as a single pool of seamless resources when accessed within edge environment 100.

Embodiment of the present invention can reside on server 110 or cloud SCC 102. Server 110 includes edge component 111 and database 116.

Edge component 111 provides the capability managing smart collectors in mobile edges by providing intelligent handshaking with cloud security and compliance center. Other capability of edge component 111 includes, but it is not limited to, (i) managing compliance and/or security rules or goals (e.g., deactivating old rules, creating new ones, modify existing ones, etc.), (ii) managing locations for all edge devices and/or client devices requesting access to edge infrastructure and (iii) predicting routes/mapping for client devices as it moves from one location to another.

Edge component 111 can include the following subcomponents, SCC component 121, edge devices 122, location component 123 and AI component 124.

SCC component 121 has the capability of managing (e.g., security, compliance, etc.) of edge devices to edge computing infrastructure. This can include allowing edge devices secured connection to the edge-computing infrastructure including resources in the cloud. Furthermore, SCC component 121 provides the capability of interfacing to an SCC (security compliance center) in the cloud.

Edge devices 122 provides the capability of tracking all edge devices within the edge computing infrastructure and tracking all client devices (i.e., client devices 104) utilizing edge computing resources.

Location component 123 provides the capability of tracking locations of client devices as it moves from one location to another within an edge computing infrastructure.

One feature of location component 123 includes "Location to SCC (Security and Compliance Center in cloud) mapping". This includes the following characteristics: (i) in security and compliance in edges there needs to be collectors/agents which can collect/scan security and compliance posture and send this to cloud server for analysis, (ii) system will have a mapping between location/region vs compliance & security requirements. Based on this mapping collectors (or it can be just changing rules or policies to execute) for each location can be made available.

One feature of location component 123 includes "dynamic location-based collector (Diff & Download)". This includes the following characteristics: (i) when an edge's location is changed from location1 to location2—system will check whether based on Location to SCC mapping, are there changes in the collector or rules, (ii) In some cases—new rules or goals need to be added. In some cases some rules must be deactivated. In such cases—cloud SCC will send DIFF (add or remove) to the collector already running in the edge and (iii) un some cases collector type itself will change. System will handshake with edge and will allow to download latest collector and deactivate previous one.

AI component 124. provides the capability of managing and applying security and compliance rules based on different scenarios/requirements from client devices. One feature of AI component 124 includes prediction/forecasting, "Predicted route-based Collector update". This feature includes the following characteristics, (i) system will keep tracking the mobility pattern of the mobile edges. Based on this if system finds that Edge is going to cross the Location to SCC mapping in 2 hours and it requires considerable download (collector or rules), system will start sending this data to edge while it is still on the path. New collector will not be installed until the edge crosses the SCC boundary. As soon as the edge crosses the boundary new installations will happen or new rules will be activated, or invalid rules will be deactivated.

AI component 124 includes predetermining collection process, "Intelligent Predetermination of irrelevant collection process". This feature includes the following characteristics, (i) in some cases, edge1 might be in transit while the Collection process has started based on location1s SCC rules or goals. If system finds that the scan usually takes 30 mins to complete based on history of previous scans in location1, and transit will happen in 15 mins, system may decide to pre terminate the collection process, as the results will be irrelevant by the time, they are available.

AI component 124 includes route adjustments, "Recommendation of route adjustment based on resources required for compliance and security scans". This feature includes the following characteristics, (i) in some cases, location1 might have heavy SCC requirements so the resources required to run the collector might be considerable. System can detect this based on edge1, edge2 which were there in the same location. Now based in edge3s mobility pattern it's found that its moving towards location1 and also based on historical analysis system may find that edge3 may not have enough resources to spare to run SCC collector in location1. In such cases—intelligent location adjustment advises can be send to edge so as to reduce the resource requirements.

Database 116 is a repository for data used by edge component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within edge environment 100, provided that edge component 111 has access to database 116.

Figure 2A:
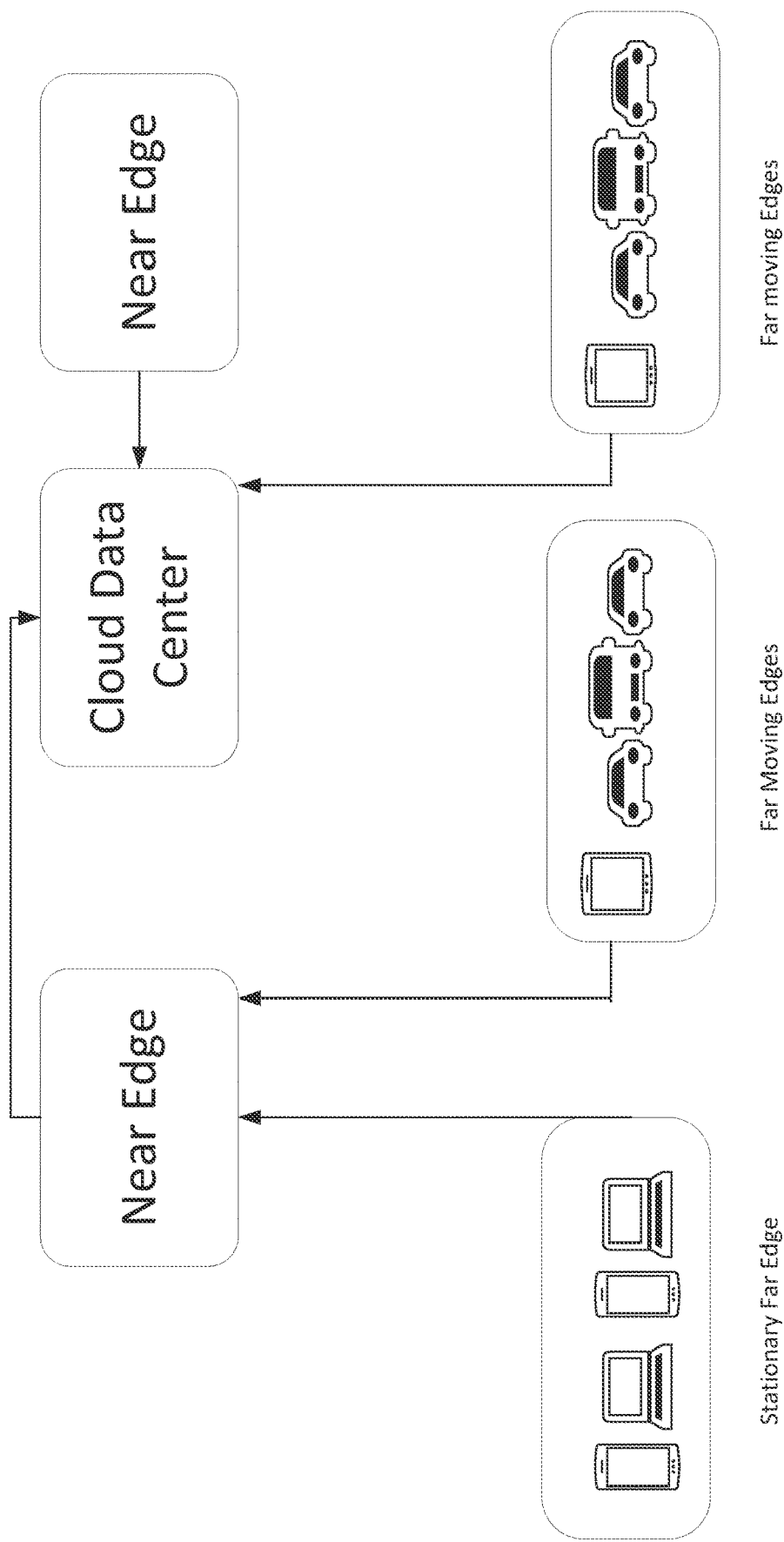
FIG. 2A is a functional block diagram illustrating the connectivity between near edge collectors, cloud SCC, stationary far edge devices and far moving edge devices, in accordance with an embodiment of the present invention.

FIG. 2A is a functional block diagram illustrating the connectivity between near edge collectors, cloud SCC, stationary far edge devices and far moving edge devices, in accordance with an embodiment of the present invention.

Figure 2B:
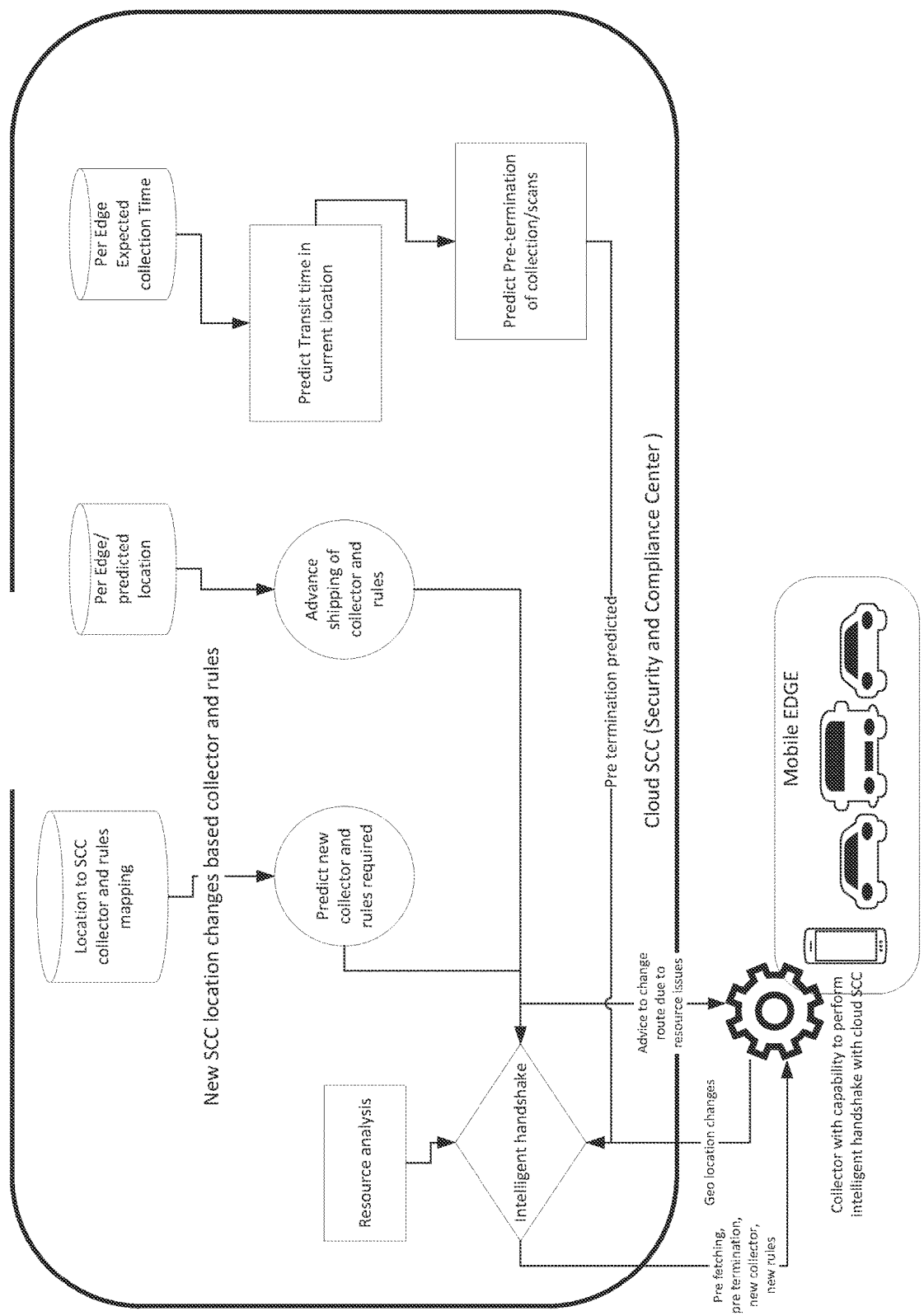
FIG. 2B is a functional block diagram illustrating the process flow/interactions between cloud SCC, mobile edge devices and collector, in accordance with an embodiment of the present invention.

FIG. 2B is a functional block diagram illustrating the process flow/interactions between cloud SCC, mobile edge devices and collector, in accordance with an embodiment of the present invention.

Figure 3:
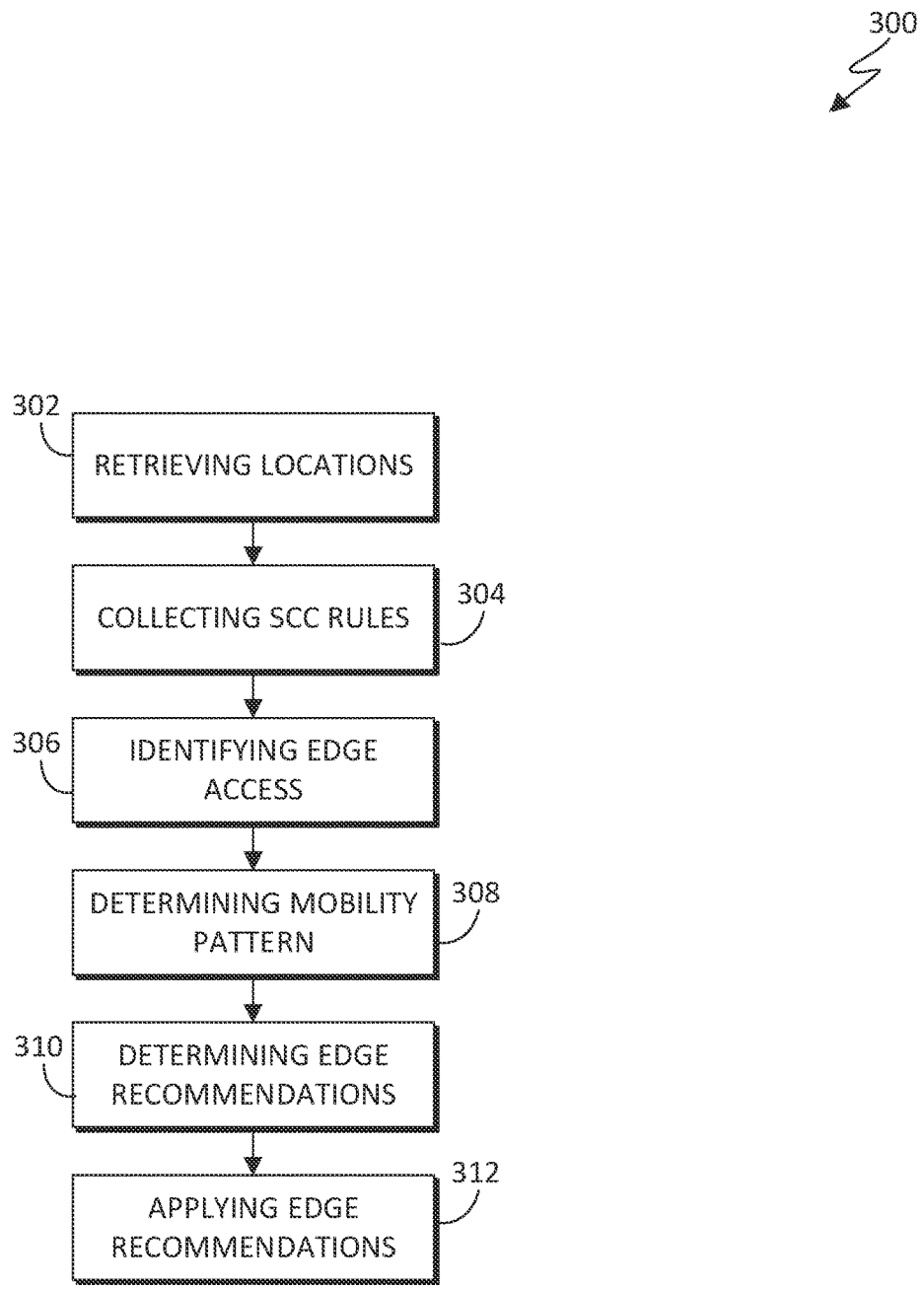
FIG. 3 is a high-level flowchart illustrating the operation of edge component 111, designated as 300, in accordance with another embodiment of the present invention.

FIG. 3 is a high-level flowchart illustrating the operation of edge component 111, designated as 300, in accordance with an embodiment of the present invention.

Edge component 111 retrieves locations (step 302). In an embodiment, edge component 111, through location component 123, retrieves locations for near edges and far edges. Edge component 111 is aware of all edge components/devices within the edge computing infrastructure, including status of device being operable, load, capacity of all resources within the edge computing infrastructure.

Furthermore, edge component 111 collects security rules for various locations for analysis (step 304). Thus, edge component 111 will have a mapping between location/region vs compliance & security requirements. Based on this mapping collectors (or it can be just changing rules or policies to execute) for each location can be made available whenever a client device moves between location.

By way of an example, a user case scenario will be used to illustrate the high-level steps. Client device 1 is a smart phone belonging to user1. User 1 is traveling from Miami, Florida to Los Angeles, California. Client device 1 has logged into an application related to user's company (i.e., sensitive records to prepare for a meeting). There are multiple collectors within the edge computing infrastructure.

Edge component 111 identifies edge access (step 306). In an embodiment, edge component 111, through SCC component 121, edge devices 122 and location component 123, identifying edge access from client devices. In continuing with the previous user case scenario, edge component 111 detects that client device 1 is accessing resources in Miami, Florida.

Edge component 111 determines the mobility pattern (step 308). In an embodiment, edge component 111, through AI component 124, determines mobility pattern associated with the edge access. Edge component 111 may try to predict/forecast the "route" and resources (e.g., software required, data/network access, etc.) required by the client devices as it traverses from one location to another.

Furthermore, based on the mobility pattern, edge component 111 can check for whether there are location based rules that are in affect between the locations (e.g., Miami to Los Angeles). When an edge's location is changed from location1 to location2—system will check whether based on Location to SCC mapping, are there changes in the collector or rules. In some cases—new rules or goals need to be added. In some cases some rules must be deactivated. In such cases—cloud SCC will send DIFF (add or remove) to the collector already running in the edge.

In continuing with the previous user case scenario, edge component 111 may forecast, based on user 1 travel pattern, may predict that user 1 is on his way to the company's headquarter in Los Angeles for a meeting. Therefore, it may predict possible resources that client device 1 may utilized during the trip.

Edge component 111 determines edge recommendations (step 310). In an embodiment, edge component 111, through AI component 124, determines edge recommendation based on the SCC rules associated with the mobility pattern. Generally, edge component 111 may determine that there is a heavy SCC requirements (i.e., so the resources required to run the collector might be considerable) based on detection. Edge component 111 can detect this based on edge1, edge2 that were there in the same location. Now, based on edge3's mobility pattern, it's found that it's moving towards location1 and also based on historical analysis, the system may find that edge3 may not have enough resources to spare to run SCC collector in location1. In such cases—intelligent location adjustment propose one or more edge recommendations. One edge recommendation can involve sending additional resources to edge to reduce the resource requirements.

In other embodiment, edge component 111 may propose edge recommendation is based on whether the first collector is able to complete an execution of the one or more SCC rules before the client devices moves the second location.

Edge component 111 applying edge recommendation (step 312). In an embodiment, edge component 111, through AI component 124 and SCC component 121 executes the one or more edge recommendations to the edge access. The system administrator may choose one solution to apply from many recommendations. Is it noted that AI component 124 may choose and apply the solution(s) without user interaction.

In continuing with the previous user case scenario, edge component 111 may decide that there's user 1 is going to cross a location to SCC mapping in 2 hours and it requires considerable download (collector or rules), then edge component 111 will start sending this data to other edge while it's still on the path. New collector will not be installed until the edge crosses the SCC boundary. As soon as the edge crosses the boundary new installations will happen or new rules will be activated, or invalid rules will be deactivated. Thus, it would be seamless transition/transparent to the user as the user arrives in Los Angeles for his meeting (while he's working on his presentation by accessing sensitive company data en route).

Figure 4:
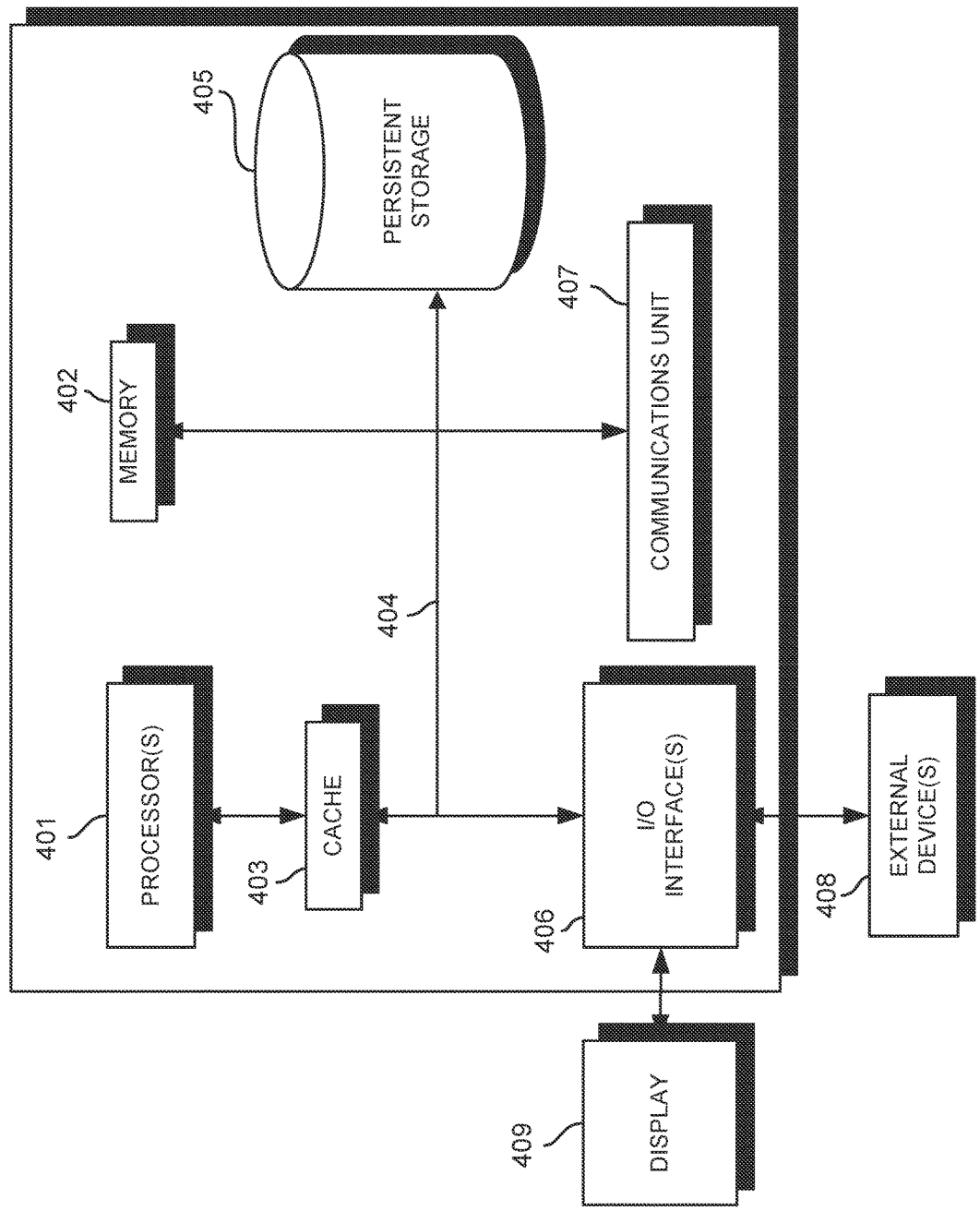
FIG. 4 depicts a block diagram, designated as 400, of components of a server computer capable of executing the edge component 111 within the edge environment 100, in accordance with an embodiment of the present invention.

FIG. 4, designated as 400, depicts a block diagram of components of edge component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data ×10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Edge component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., edge component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., edge component 111) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

Finally, the proposed concept may be summarized in a nutshell in the following clauses:

1. A system may be implemented by extending traditional cloud centric edge computing architecture.
2. System will keep identifying the far edges and near edges based on the edge gateways network capabilities:
   1. Reachability
   2. Availability
   3. Upload and Download capability
   4. Locality
   5. Mobility
3. Each gateway or edge computing environment will have a classification (Far or near). This can change. Cloud service will keep tracking of these parameters.
4. Each edge can take part in cloud based ESCC (edge security and compliance center).
5. In the centralized ESCC—admin can select the security controls rules (e g: dynamic scan rules and scan types) and compliance goals.
6. Cloud service will keep identifying mobility patterns of far edges.
7. System will also have a mapping of SCC locations and required collectors and security rules and scans.
8. In case of mobile edges—system will have a mapping of geo locations (MAP points) where the SCC locations may change.
9. If mobile edge SCC location is switched—system will initiate a handshake between cloud SCC and mobile edge.
10. Cloud SCC will calculate the DIFF:
    1. New security rules to be sent to edge
    2. Rules that need to be deactivated
    3. New collectors to be sent
    4. Collectors to be deactivated
11. Based on this list, Cloud SCC will initiate the transfer of the collectors and rules.
12. SCC is a security and compliance center for an enterprise cloud management system which receives details from agents or collectors which can be installed in target systems.
13. SCC will also initiate deactivation of invalid rules and collectors.
14. Based on mobility pattern—system will be able to predict the list (explained in step 10) in advance.
15. In such cases, cloud SCC will send these to edge in advance.
16. Activation and deactivation will only begin when the location is actually crossed.
17. In some cases, the transit time through a location will be less compared to the overall scan and collection time.
18. In such cases, SCC will pre terminate scans as the results will be irrelevant once boundary is crossed.
19. Cloud SCC will keep track of the resources required to run scans and collection process.
20. This can be done through historic analysis of all edge resource usage etc.
21. If cloud SCC finds that an edge that's going to get to a location, where collection and security scans need more resource than actually edge can provide, system may suggest the edge to change the route or mobility pattern.
22. If edge is not able to honor the request, cloud SCC may send a warning to admin of edge as the edge SCC results may be not comprehensive hence visibility to actual security and compliance posture may be minimal.
23. In such cases admin may reduce time required to be spent in such questionable compliance locations.
24. The method includes a step of having location to SCC mapping where, in security and compliance in edges there needs to be collectors/agents which can collect/scan security and compliance posture and send this to cloud server for analysis.
25. The method includes a step wherein, the system will have a mapping between location/region vs compliance & security requirements. Based on this mapping collectors (or it can be just changing rules or policies to execute) for each location can be made available.
26. The method includes a step for dynamic location-based collector (Diff & Download) wherein, when an edge's location is changed from location1 to location2—system will check whether based on Location to SCC mapping, are there changes in the collector or rules.
27. The method includes a step where, in some cases, new rules or goals need to be added. In some cases, some rules must be deactivated. In such cases, cloud SCC will send DIFF (add or remove) to the collector already running in the edge.
28. The method includes a step where, in some cases collector type itself will change. System will handshake with edge and will allow to download latest collector and deactivate previous one.
29. The method includes a step for predicted route-based Collector update wherein, the system will keep tracking the mobility pattern of the mobile edges. Based on this if system finds that Edge is going to cross the Location to SCC mapping in 2 hours and it requires considerable download (collector or rules), system will start sending this data to edge while it's still on the path. New collector will not be installed until the edge crosses the SCC boundary. As soon as the edge crosses the boundary new installations will happen or new rules will be activated, or invalid rules will be deactivated.
30. The method includes a step for intelligent predetermination of irrelevant collection process where, in some cases, edge1 might be in transit while the Collection process has started based on location 1's SCC rules or goals. If system finds that the scan usually takes 30 mins to complete based on history of previous scans in location1, and transit will happen in 15 mins, system may decide to pre terminate the collection process as the results will be irrelevant by the time, they are available.

31. The method includes a step for recommendation of route adjustment based on resources required for compliance and security scans where, in some cases, location1 might have heavy SCC requirements so the resources required to run the collector might be considerable. System can detect this based on edge1, edge2 which were there in the same location. Now based in edge3s mobility patter it's found that its moving towards location1 and also based on historical analysis system may find that edge3 may not have enough.

32. Other embodiments of a high-level process flow may include the following steps, wherein the system will keep identifying the far edges and near edges based on the edge gateways network capabilities: a) reachability, b) availability, c) upload and download capability, d) locality, and e) mobility.

What is claimed is:

1. A computer-implemented method for managing security and compliance of client devices while the client devices are moving within an edge computing infrastructure, the computer-method comprising:
   retrieving locations for near edges and far edges based on edge gateway network capabilities that includes only, i) reachability, ii) availability, iii) upload and download capability, iv) locality and v) mobility;
   collecting, by one or more collectors, one or more SCC (Security Compliance Center) rules of an SCC component, wherein the SCC component includes, AI (artificial intelligence) subcomponent, location subcomponent, edge devices subcomponent and SCC subcomponent;
   identifying edge access from one or more client devices;
   determining one or more mobility patterns of the one or more client devices associated with the edge access;
   determining one or more edge recommendations, by the AI subcomponent, based on the one or more mobility patterns, wherein the one or more edge recommendations further comprises, i) new security rules to be sent to edge, ii) rules that needs to be deactivated, iii) new collectors to be sent and collectors to be deactivated, iv) initiate transfer of collector and rules, v) terminating scan time when client devices crossed different edge, vi) suggesting security scans at another location and vii) warning that security and compliance posture may be minimal for an edge; and
   executing the one or more edge recommendations.

2. The computer-implemented method of claim 1, wherein retrieving locations for near edges and far edges further comprising:
   creating one or more mapping location associated with the near and far edge and the one or more collectors.

3. The computer-implemented method of claim 1, wherein identifying edge access from the one or more client devices, further comprising:
   detecting access to the edge computing infrastructure from the one or more client devices.

4. The computer-implemented method of claim 1, wherein determining the one or more mobility patterns associated with the edge access, further comprising:
   determining a first location, by a first collector of the one or more collectors, of the one or more client devices based on a first time interval;
   determining the one or more SCC rules associated with the first location;
   forecasting a second location of the one or more client devices based on historical analysis and pattern of client; and
   determining the one or more SCC rules associated with the second location.

5. The computer-implemented method of claim 4, wherein determining the one or more edge recommendations based on the one or more mobility patterns, further comprising:
   determining whether the first collector of the one or more collectors is able to complete an execution of the one or more SCC rules for the one or more client devices before the one or more client devices moves to the second location.

6. The computer-implemented method of claim 5, executing the one or more edge recommendations, further comprising:
   in response to the first collector of the one or more collectors is not able to complete the execution of the one or more SCC rules, requesting the second location to complete the execution of the one or more SCC rules.

7. The computer-implemented method of claim 1, wherein the one or more SCC rules further comprises, security control rules, adding/removing collectors running on edge and security scans.

8. The computer-implemented method of claim 1, wherein one or more features of the location subcomponent includes, i) location to SCC mapping and ii) dynamic location-based collector and one or more features of the Ai subcomponent includes, i) predicted route-based collector update, ii) intelligent predetermination of irrelevant process, and iii) recommendation of route adjustment based on resources required for compliance and security scans.

9. A security edge system, the security edge system comprising:
   a SCC (security compliance center) in cloud associated with an edge computing architecture;
   one or more collectors associated with the SCC cloud and the edge computing architecture;
   a security coordinator disposed within the SCC cloud, wherein the security coordinator is configured to manage the one or more collectors and the one or more client devices based on one or more security rules;
   one or more client devices utilizing the edge computing architecture;
   one or more non-transitory computer readable storage media; and
   program instructions stored on the one or more non-transitory computer readable storage media for execution by the security coordinator when executed, the program instructions performs the steps of:
      retrieving locations for near edges and far edges based on edge gateway network capabilities that includes only, i) reachability, ii) availability, iii) upload and download capability, iv) locality and v) mobility;
      collecting, by one or more collectors, one or more SCC(Security Compliance Center) rules of an SCC component, wherein the SCC component includes, AI (artificial intelligence) subcomponent, location subcomponent, edge devices subcomponent and SCC subcomponent;
      identifying edge access from one or more client devices;
      determining one or more mobility patterns of the one or more client devices associated with the edge access;
      determining one or more edge recommendations, by the AI subcomponent, based on the one or more mobility patterns, wherein the one or more edge recommendations further comprises, i) new security rules to be sent to edge, ii) rules that needs to be deactivated, iii) new collectors to be sent and collectors to be deactivated, iv) initiate transfer of collector and rules, v) terminating scan time when client devices crossed different edge, vi) suggesting security scans at another location and vii) warning that security and compliance posture may be minimal for an edge; and executing the one or more edge recommendations.

10. The security edge system of claim 9, wherein one or more features of the location subcomponent includes, i) location to SCC mapping and ii) dynamic location-based collector and one or more features of the Ai subcomponent includes, i) predicted route-based collector update, ii) intelligent predetermination of irrelevant process, and iii) recommendation of route adjustment based on resources required for compliance and security scans.

11. The security edge system of claim 9, wherein the on one or more security rules further comprises of, security control rules, adding/removing collectors running on edge and security scans.

12. The security edge system of claim 10, wherein retrieving locations for near edges and far edges further comprising:

creating one or more mapping location associated with the near and far edge and the one or more collectors.

13. The security edge system of claim 10, wherein identifying edge access from the one or more client devices, further comprising:

detecting access to the edge computing infrastructure from the one or more client devices.

14. The security edge system of claim 10, wherein determining the one or more mobility patterns associated with the edge access, further comprising:

determining a first location, by a first collector of the one or more collectors, of the one or more client devices based on a first time interval;

determining the one or more SCC rules associated with the first location;

forecasting a second location of the one or more client devices based on historical analysis and pattern of client; and determining the one or more SCC rules associated with the second location.

15. The security edge system of claim 14, wherein determining the one or more edge recommendations based on the one or more mobility patterns, further comprising:

determining whether the first collector of the one or more collectors is able to complete an execution of the one or more SCC rules for the one or more client devices before the one or more client devices moves to the second location.

16. The security edge system of claim 15, executing the one or more edge recommendations, further comprising:

in response to the first collector of the one or more collectors is not able to complete the execution of the one or more SCC rules requesting the second location to complete the execution of the one or more SCC rules.

17. A computer program product for managing security and compliance of client devices while the client devices are moving within an in edge computing infrastructure, further comprising:

one or more non-transitory computer readable storage media and program instructions stored on the one or more non-transitory computer readable storage media, the program instructions comprising the steps of:

retrieving locations for near edges and far edges based on edge gateway network capabilities that includes only, i) reachability, ii) availability, iii) upload and download capability, iv) locality and v) mobility;

collecting, by one or more collectors, one or more SCC(Security Compliance Center) rules of an SCC component, wherein the SCC component includes, AI (artificial intelligence) subcomponent, location subcomponent, edge devices subcomponent and SCC subcomponent;

identifying edge access from one or more client devices;

determining one or more mobility patterns of the one or more client devices associated with the edge access;

determining one or more edge recommendations, by the AI subcomponent, based on the one or more mobility patterns, wherein the one or more edge recommendations further comprises, i) new security rules to be sent to edge, ii) rules that needs to be deactivated, iii) new collectors to be sent and collectors to be deactivated, iv) initiate transfer of collector and rules, v) terminating scan time when client devices crossed different edge, vi) suggesting security scans at another location and vii) warning that security and compliance posture may be minimal for an edge; and executing the one or more edge recommendations.

18. The computer program product of claim 17, wherein determining the one or more mobility patterns associated with the edge access, further comprising:

determining a first location, by a first collector of the one or more collectors, of the one or more client devices based on a first time interval;

determining the one or more SCC rules associated with the first location;

forecasting a second location of the one or more client devices based on historical analysis and pattern of client; and determining the one or more SCC rules associated with the second location.

19. The computer program product of claim 18, wherein determining the edge recommendation based on the one or more mobility patterns, further comprising:

determining whether the first collector of the one or more collectors is able to complete an execution of the one or more SCC rules for the one or more client devices before the one or more client devices moves to the second location.

20. The computer program product of claim 19, executing the edge recommendation, further comprising:

in response to the first collector of the one or more collectors is not able to complete the execution of the one or more SCC rules, requesting the second location to complete the execution of the one or more SCC rules.

* * * * *